(12) United States Patent
Clark et al.

(10) Patent No.: US 12,553,461 B1
(45) Date of Patent: Feb. 17, 2026

(54) UNIVERSAL COUPLING SYSTEM AND METHOD OF USE

(71) Applicants: Donald G Clark, Pasadena, TX (US); Ian R Brown, Dallas, TX (US)

(72) Inventors: Donald G Clark, Pasadena, TX (US); Ian R Brown, Dallas, TX (US)

( * ) Notice: Subject to any disclaimer, the term of this patent is extended or adjusted under 35 U.S.C. 154(b) by 0 days.

(21) Appl. No.: 19/242,081

(22) Filed: Jun. 18, 2025

(51) Int. Cl.
*F16B 13/08* (2006.01)
(52) U.S. Cl.
CPC .................... *F16B 13/0891* (2013.01)
(58) Field of Classification Search
CPC .................................................. F16B 13/0891
See application file for complete search history.

(56) References Cited

U.S. PATENT DOCUMENTS

| | | | |
|---|---|---|---|
| 12,097,445 B2* | 9/2024 | Monteverde | A63H 33/108 |
| 2021/0180637 A1* | 6/2021 | Liu | F16B 13/0891 |
| 2022/0307517 A1* | 9/2022 | Peterson | F04B 43/026 |
| 2022/0347594 A1* | 11/2022 | Marzetta | A63H 33/101 |
| 2023/0009104 A1* | 1/2023 | Milekovic | F16B 7/20 |
| 2023/0172347 A1* | 6/2023 | Hanchett | A45F 5/02 24/578.13 |

* cited by examiner

*Primary Examiner* — David M Upchurch
(74) *Attorney, Agent, or Firm* — Richard Eldredge; Leavitt Eldredge Law Firm (57) ABSTRACT

A coupling system includes an upper housing with a body with an elongated axis; a plurality of slots extending through the body; and a plurality of locking members slidingly engaged within each of the plurality of slots, the plurality of locking members are configured to move in a direction away from the elongated axis of the body. A lower housing integrally attached to the upper housing, the lower housing having a cavity; and a first grip disposed with the housing.

8 Claims, 16 Drawing Sheets

UNIVERSAL COUPLING SYSTEM AND METHOD OF USE

BACKGROUND

1. Field of the Invention

The present invention relates generally to coupling systems and methods of use, and more specifically, to a universal coupling system.

2. Description of Related Art

Coupling devices are well known in the art. They provide quick and effective means to couple and remove objects to supporting structures. One problem commonly associated with couplings is that they are adapted to a specific geometric shape. It is believed that the present invention describes a coupling system that can be utilized with joining members with different shapes and sizes.

Accordingly, although great strides have been made in the area of coupling systems, many shortcomings remain.

DESCRIPTION OF THE DRAWINGS

The appended claims set forth the novel features believed characteristic of the embodiments of the present application. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the device are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments are expressly contemplated herein so that one of ordinary skill in the art would appreciate from this disclosure that the features, elements, and/or functions of one embodiment may be incorporated into another embodiment as appropriate unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

This application is described as a universal coupling used to connect an actuator and a valve. Typical couplings are made from a machined billet piece that is limited to the valve and actuator combination it was created for. The universal coupling allows multiple valve and actuator combinations to be created and mounted together using the same coupling through its unique universal features. It will fit many different manufacturers' sizes, greatly reducing the near infinite variations required today by couplings, down to a handful.

The coupling brings great benefit to the industry as it cuts costs, reduces lead times waiting for custom couplings to be made, lowers inventory management, and brings cost of ownership down. The universal coupling is designed to fit multiple manufacturers of actuators with different key ways and fit multiple valve manufacturers with different valve stem dimensions, including most quarter turn valves from, but not limited to, ½"-42" without having to custom design the fitting to each valve stem. The concept is expandable to valves and their respective actuators ranges used in the majority of applications.

Accordingly, it is an object of the present application to provide a universal application to both the valve side of the mounting equation and the actuator side. Each side of the valve to actuator connection has industry standard geometries that the universal coupling can adjust to and provide a strong, dependable connection between a valve and an actuator for use Referring now to the drawings wherein like reference characters identify corresponding or similar elements throughout the several views, FIGS. 1-16 depict various views of the system and method of use in accordance with one preferred embodiment of the present application.

Figure 6:
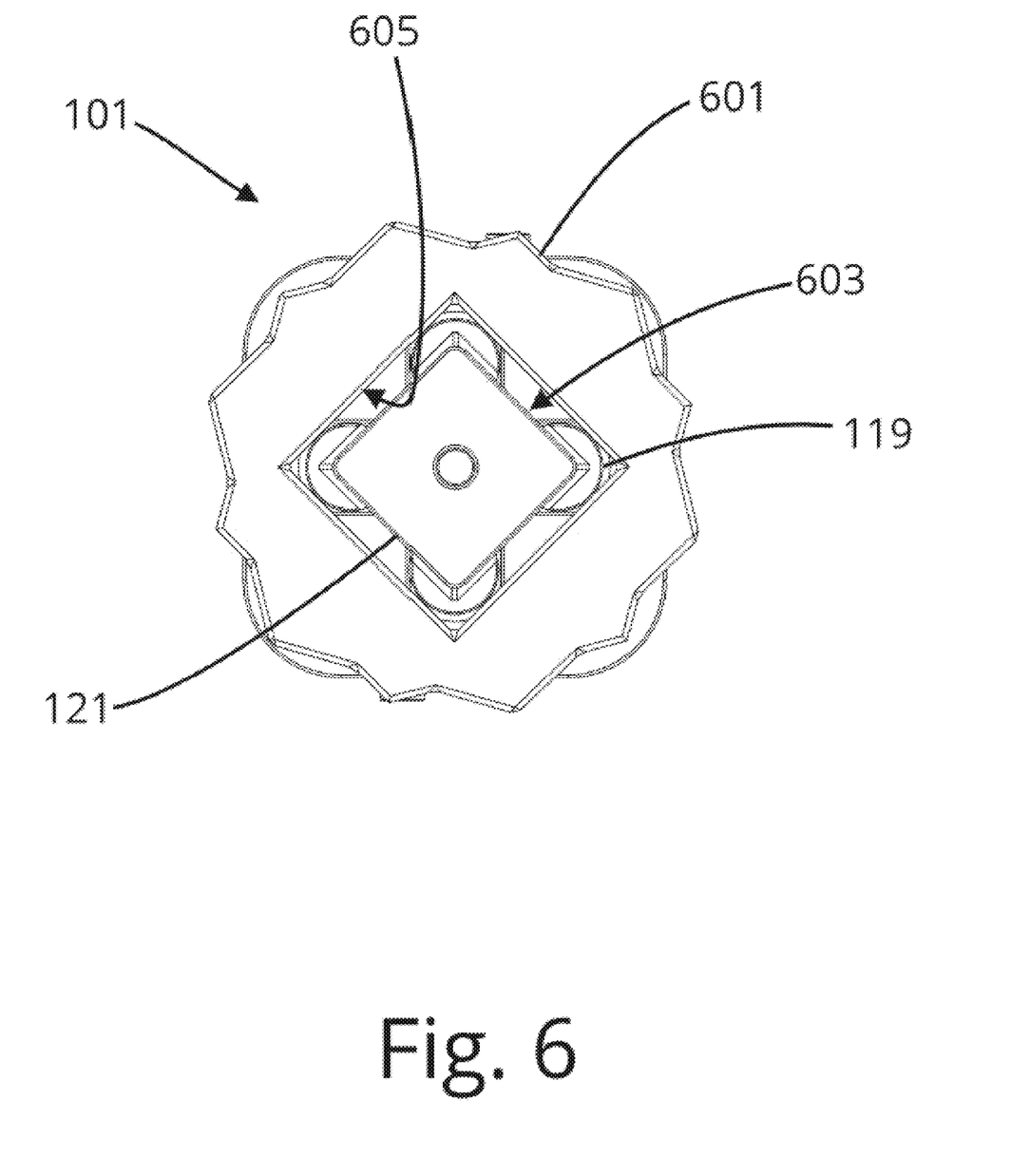
FIG. 6 is a top view of the system of FIG. 2 attached to a female device.
Figure 7:
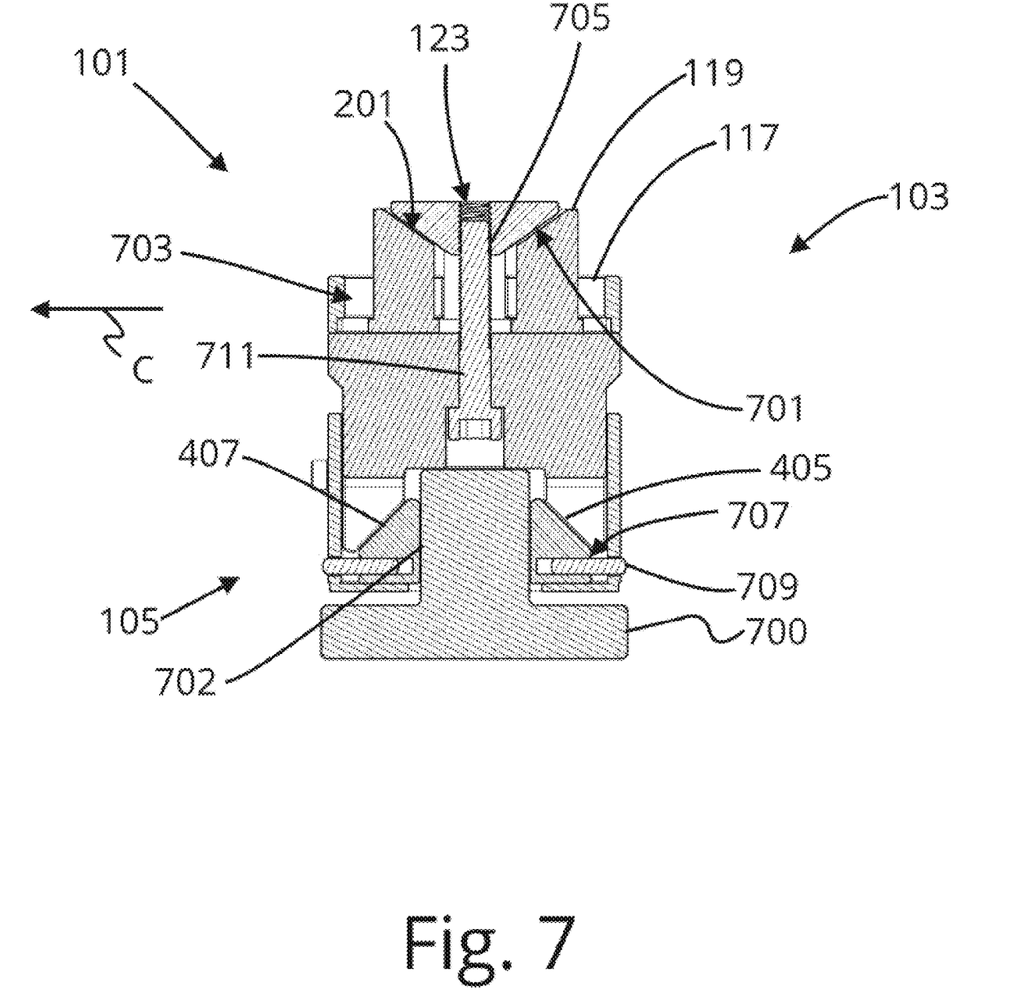
FIG. 7 is a cross-sectional view of FIG. 2 attached to a male device.
Figure 8:
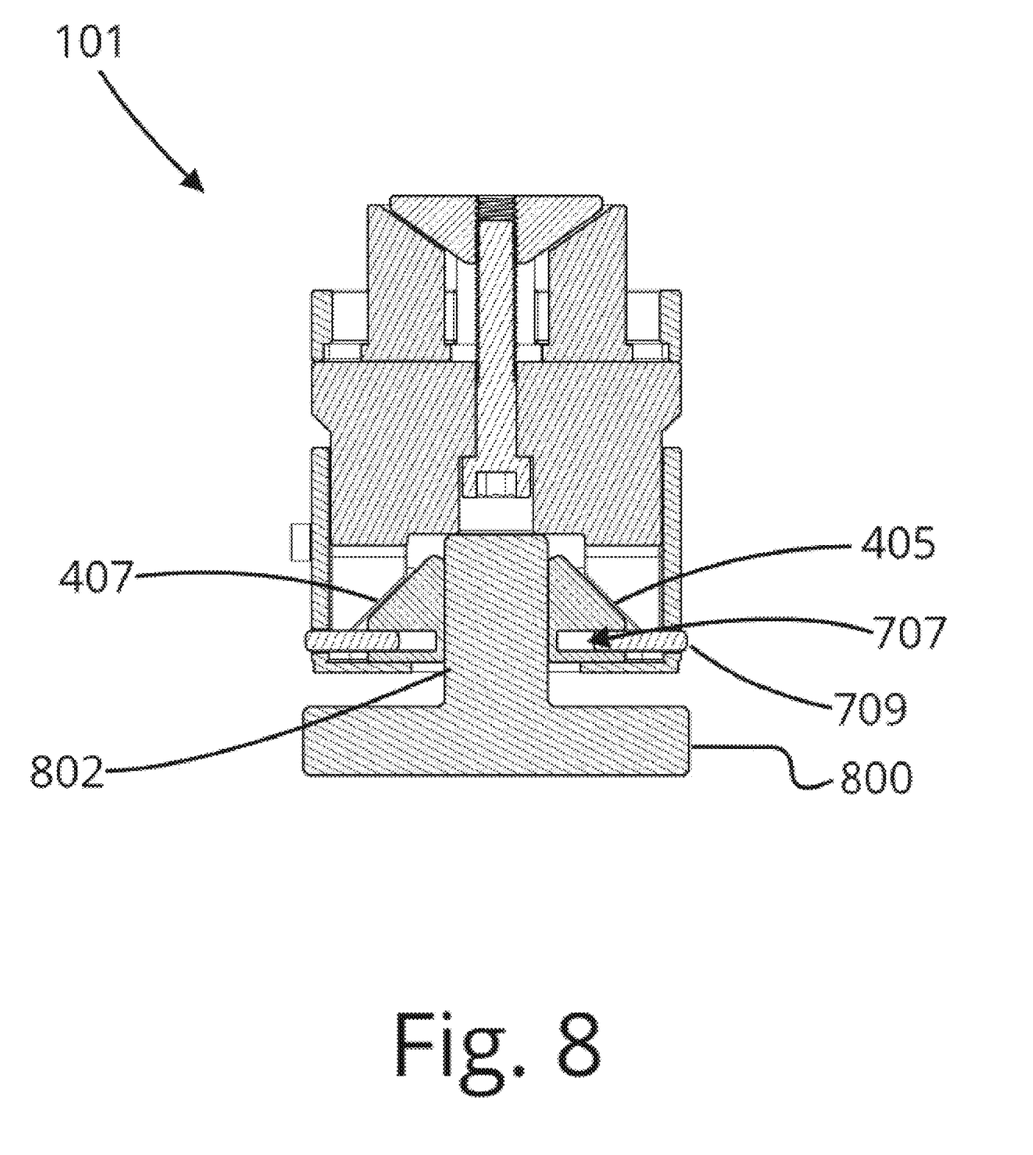
FIG. 8 is a cross-sectional view of FIG. 2 attached to a male device.
Figure 9:
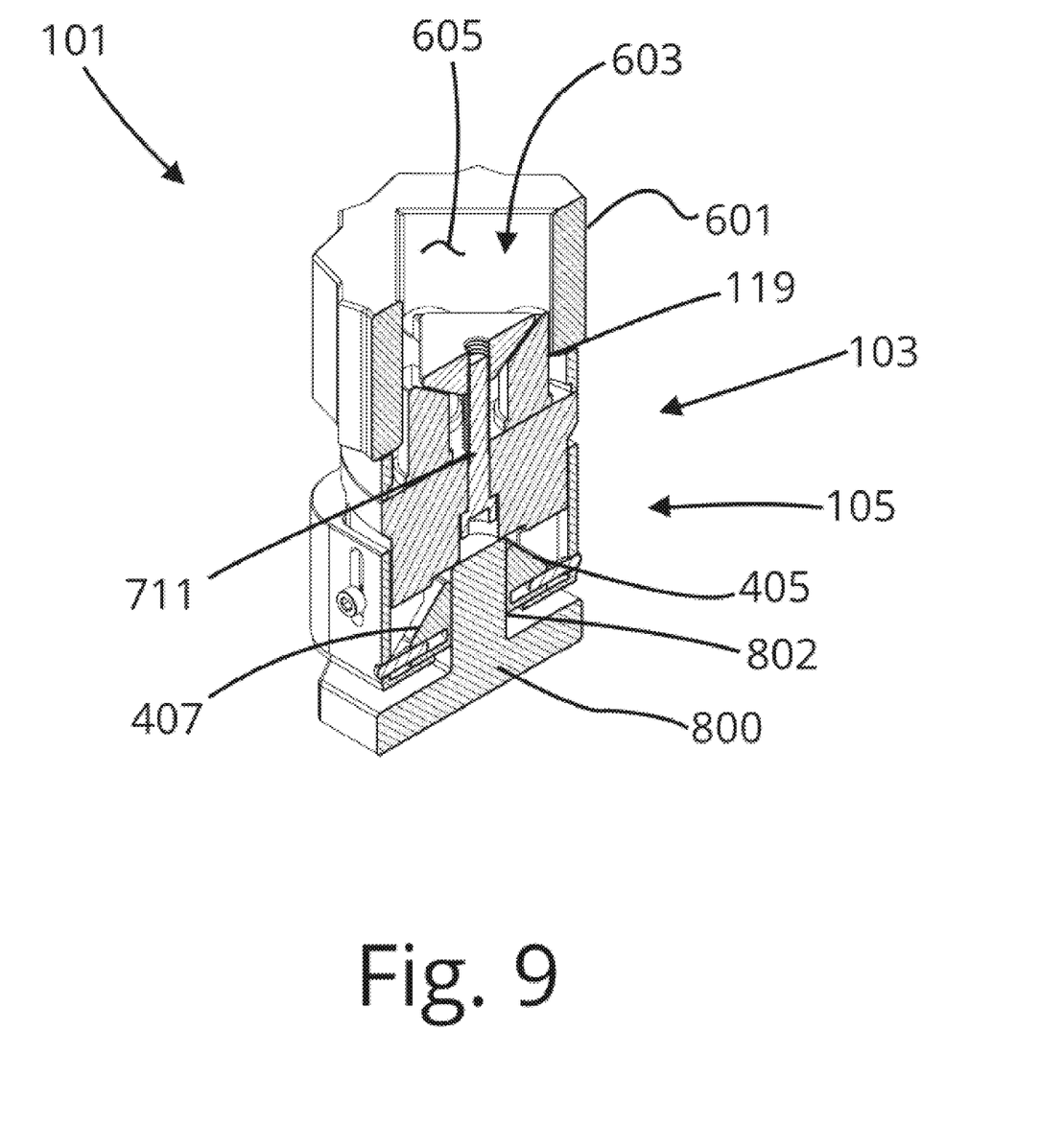
FIG. 9 is a cross-sectional view of the system of FIG. 6.

In particular, the universal coupling system 101 includes an upper housing 103 configured to releasable engage with a female device 106 (see e.g., FIG. 6) and a lower housing 105 configured to releasably engage with a male device 700 (see e.g., FIG. 7). One of the unique features believed characteristic of the present invention is the ability to releasable engage with female and male devices of different shapes and sizes. The drawings will illustrate these unique features.

Figure 1:
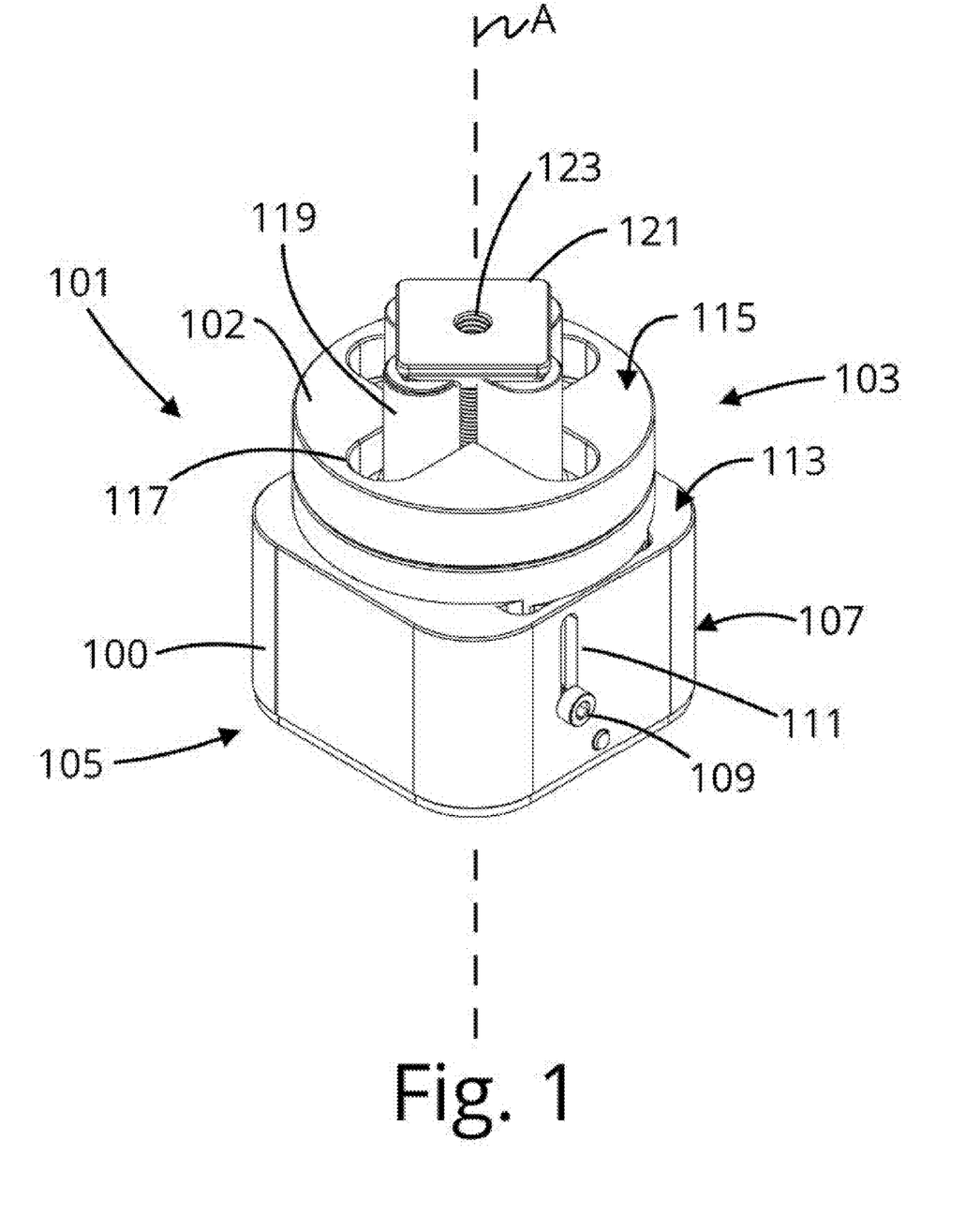
FIG. 1 is an oblique view of a universal coupling system in accordance with one preferred embodiment of the present invention.

FIG. 1 is an oblique view of system 101 that includes upper housing 103 integrally engaged with lower housing 105. In the preferred embodiment, the upper housing 103 in configured to releasably engage with an object that has opening, while lower housing 105 is configured to releasably engage with an object that has a protrusion. However, as shown in the drawings, different embodiments could include different types of housings with these or similar features.

Figure 4:
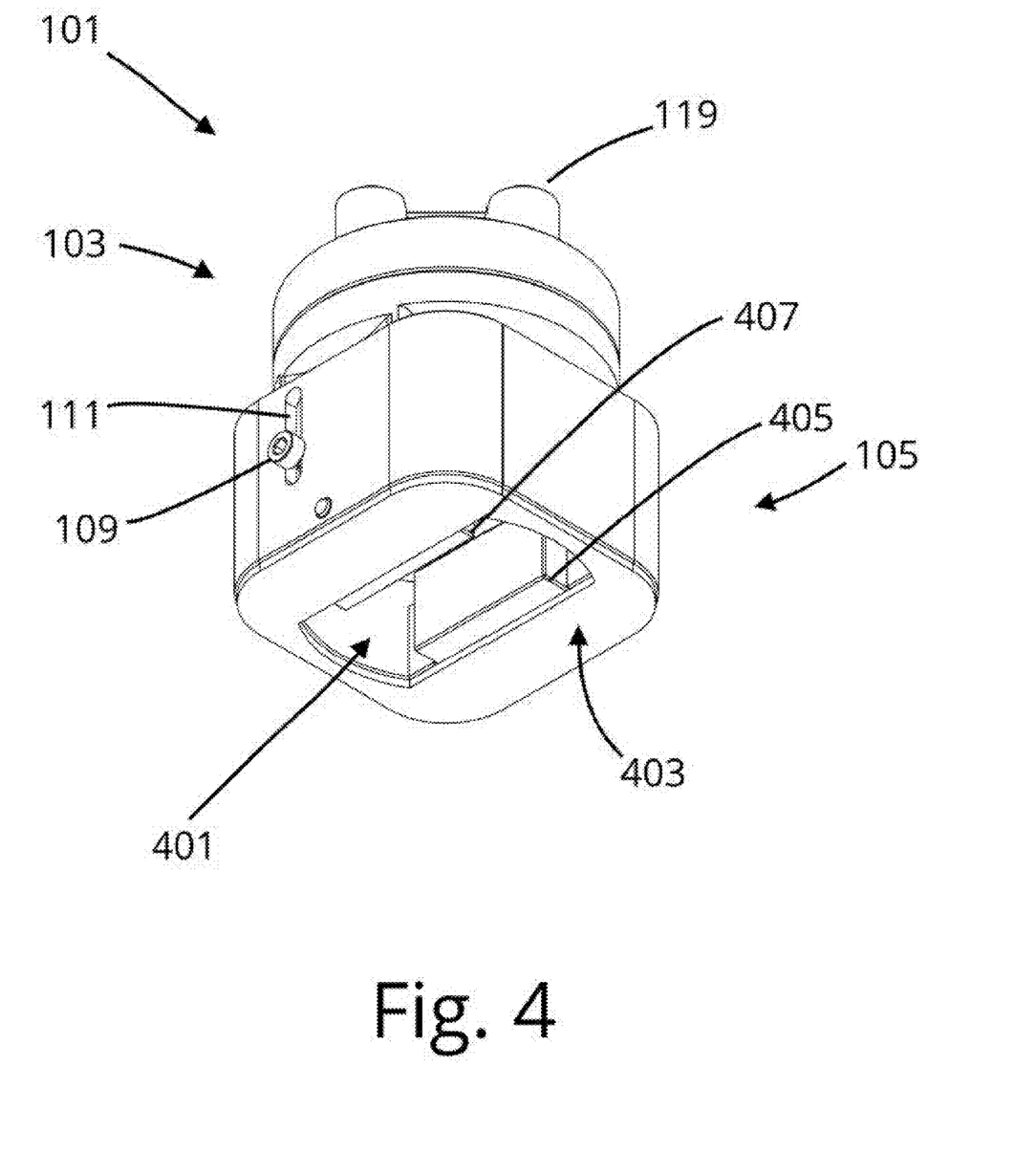
FIG. 4 is an oblique-bottom view of the system of FIG. 2.
Figure 5:
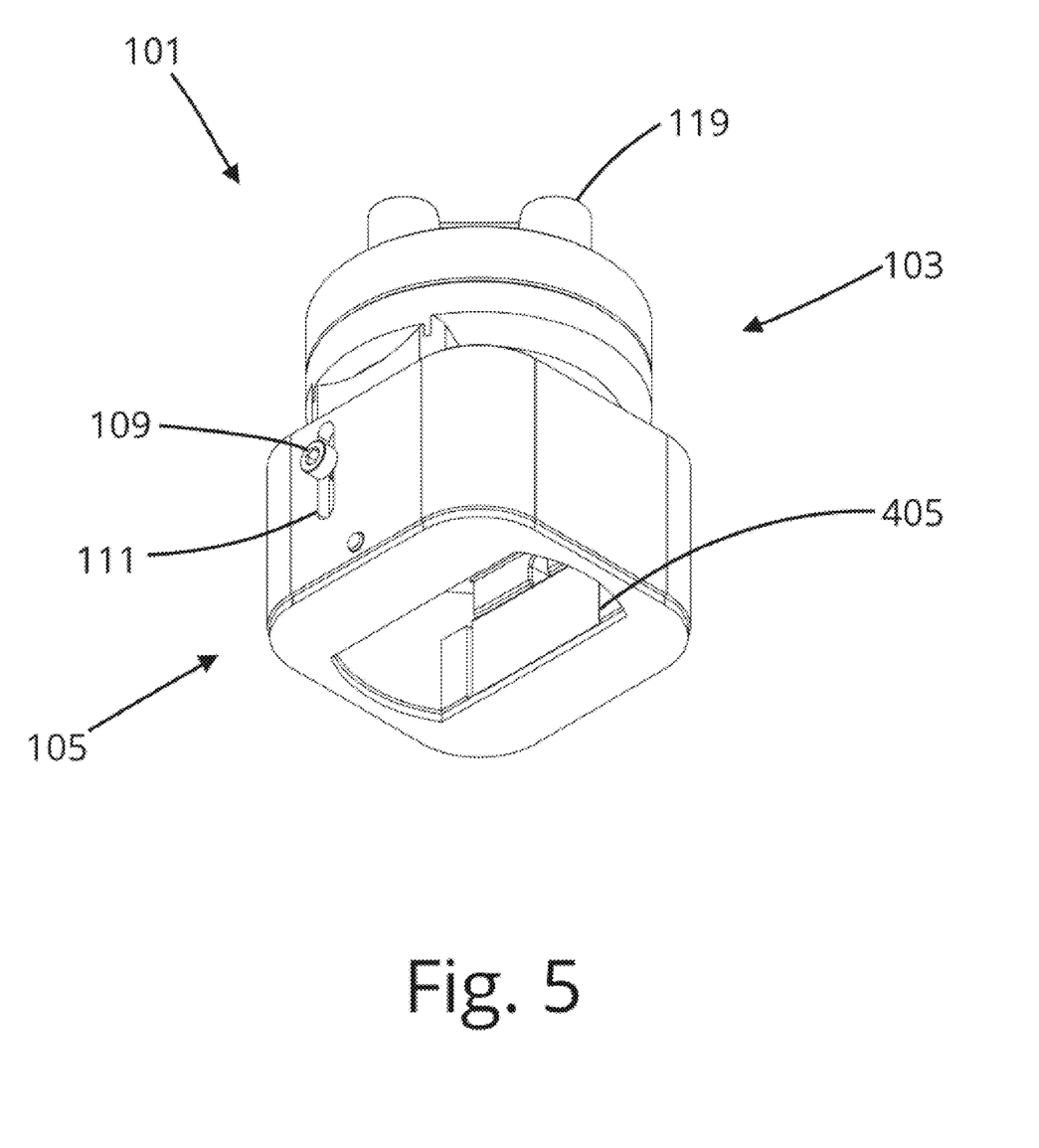
FIG. 5 is an oblique-bottom view of the system of FIG. 2.

Lower housing 105 includes a body 100 with an outer surface 107. A vertical slot 111 extends through the body 100 and provides sliding directions for a toggle 109. As shown in FIG. 4, the body 100 forms a cavity 401 from the bottom surface 403. Disposed within the cavity 401 is a first elongated grip 405 and a second elongated grip 407. During use, the two elongated grips 405, 407 are moved in position to engage with a protrusion 702 of the male device 700. To achieve this, the toggle 109 slide along the contoured surface of grips 405, 407, which in turn causes the grips to move in a direction towards the protrusion 702 while the toggle 109 slides in a direction B, which is parallel to the elongated length A of the system 101. To further assist, it is contemplated having a slot 707 within the grips 405, 407 that slidingly engage with guide 709. These features are further shown in FIG. 7.

Upper housing 103 includes a body 102 with a plurality of slots 111 extending through the thickness thereof. In the exemplary embodiment, the upper housing 103 includes four slots that are configured to engage with four locking members 119. A piston head 121 engages with each of the four locking members 119 and includes a threaded port 123.

Figure 2:
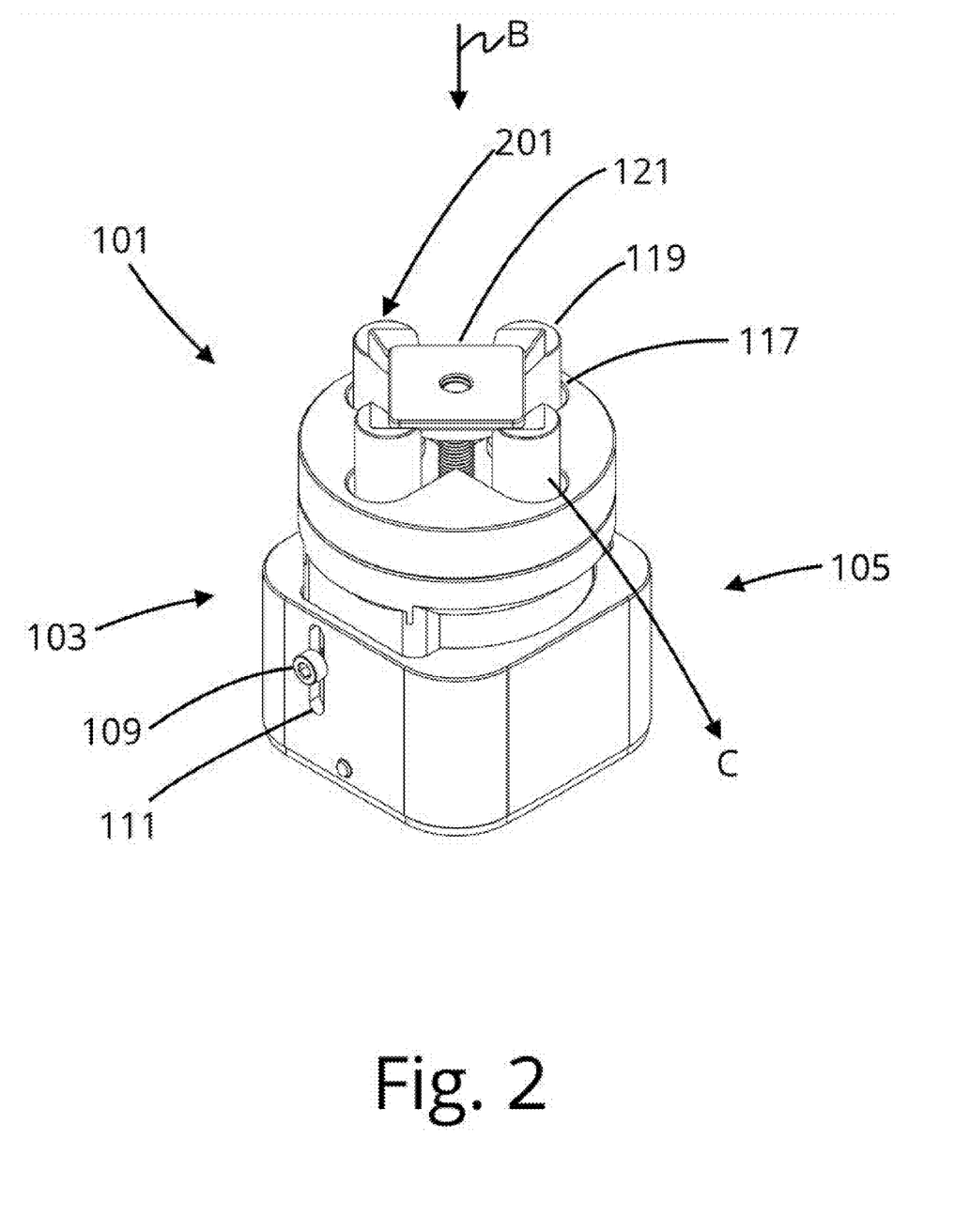
FIG. 2 is an oblique view of a universal coupling system in accordance with one preferred embodiment of the present invention.
Figure 3:
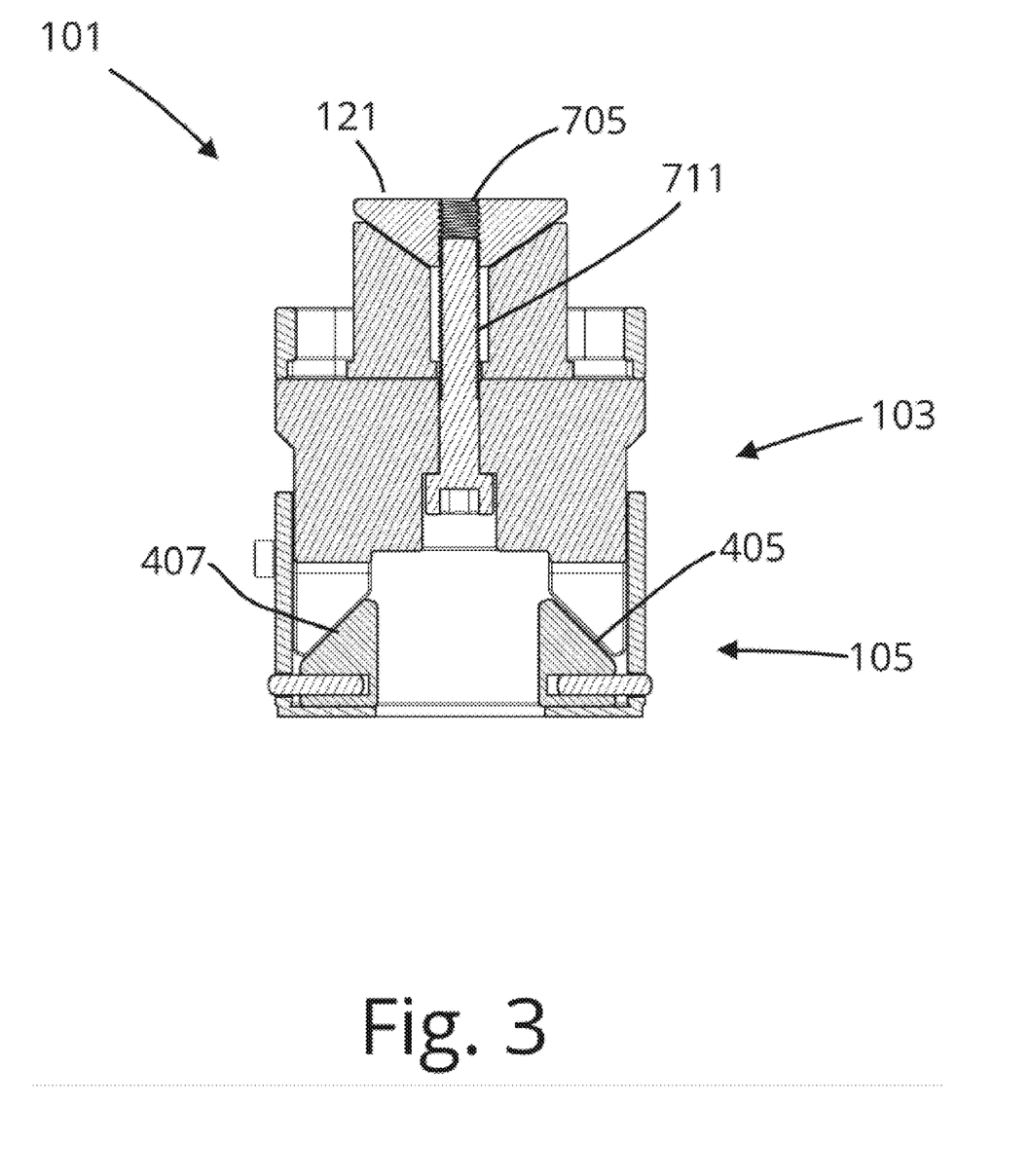
FIG. 3 is a cross-sectional view of the universal coupling system of FIG. 2.

As shown in FIG. 3, a fastener 711 has a threaded area 705 that threadedly engages with threaded port 123. The rotational movement of the fastener 711 causes the piston head 121 to move in direction B, which in turn causes the plurality of locking members 119 to move in direction C. As shown in FIG. 2, the plurality of locking members 119 includes contoured surfaces 201 that slidingly engage with piston head 121 are oriented in a direction to cause the plurality of locking members to move in direction C as piston head moves in direction C. This feature enables plurality of locking members 119 to engage with an inner surface 605 of an opening 603 formed by female member 601, as shown in FIG. 6.

Figure 10:
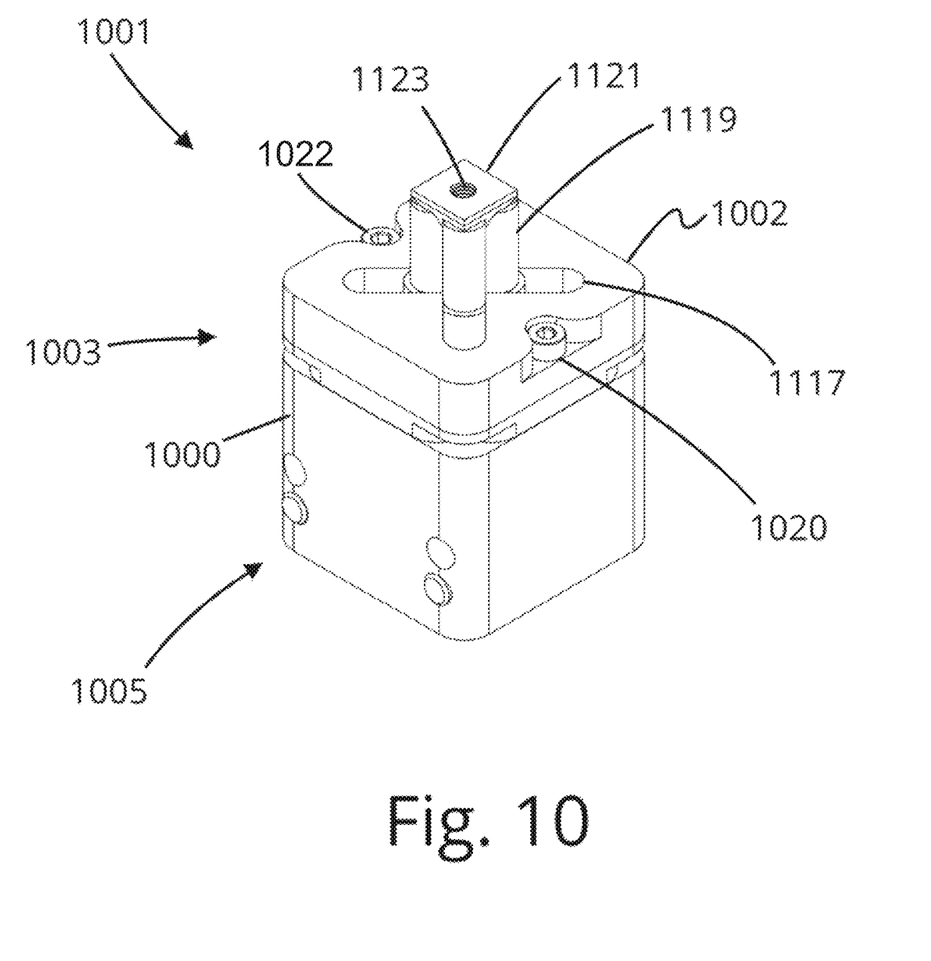
FIG. 10 is an oblique view of an alternative embodiment of the system of FIG. 2.

Referring now to FIG. 10 in the drawings, an alternative embodiment of the present application is shown. System 1001 includes one of more of the features of system 101 and includes an upper housing 1003 integral with a lower housing 1005.

Figure 11:
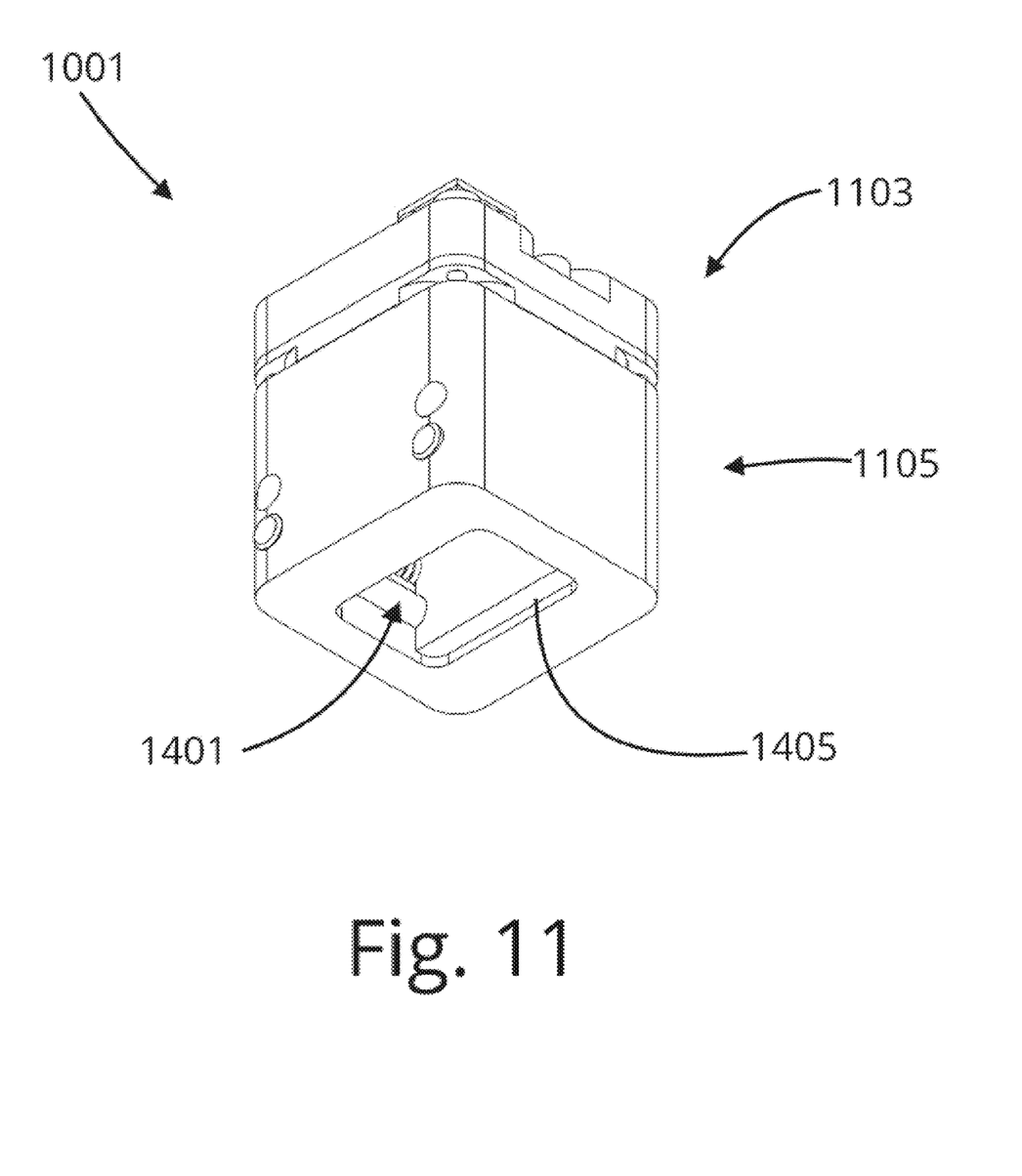
FIG. 11 is a bottom-oblique view of the system of FIG. 10.
Figure 13:
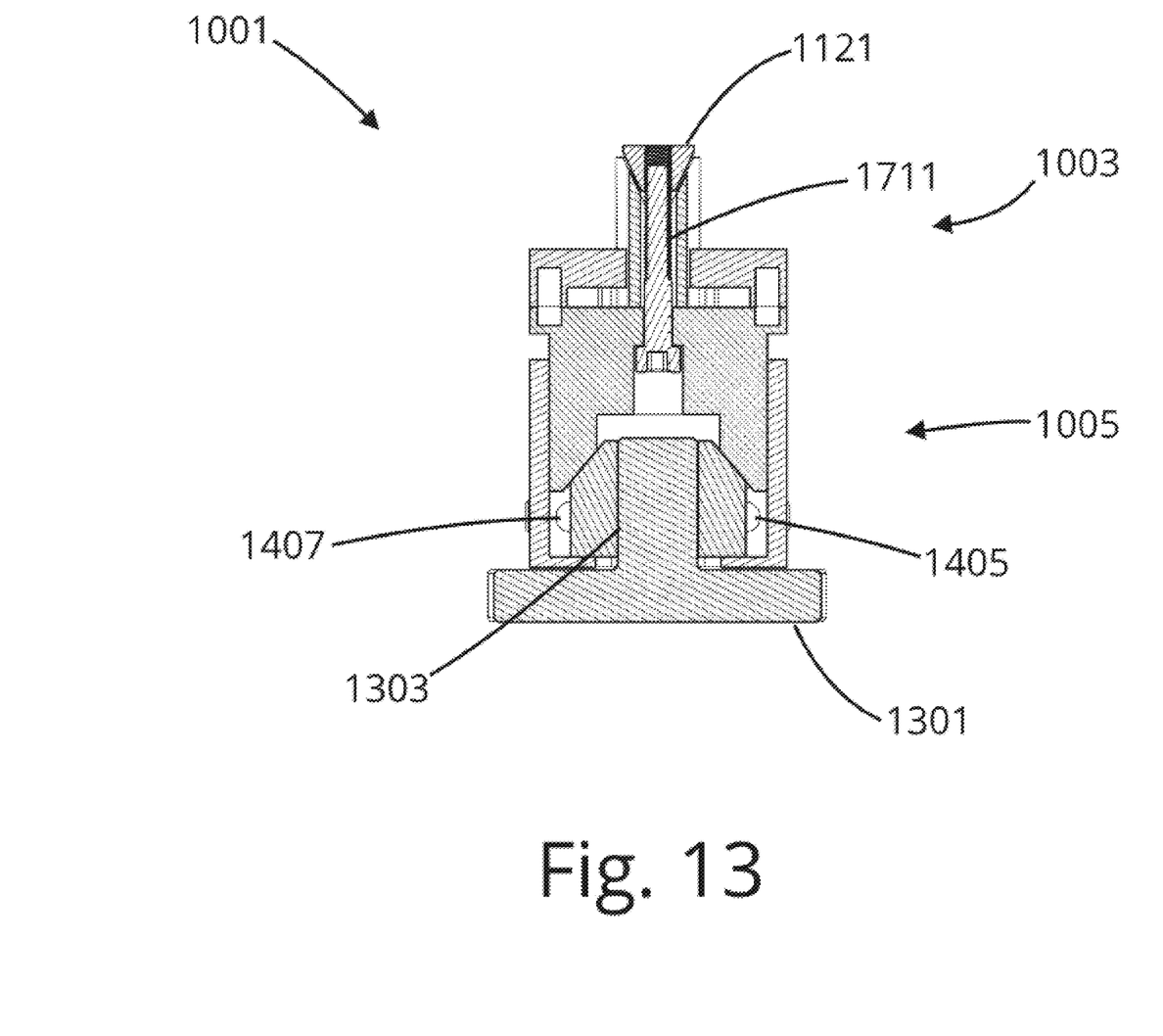
FIG. 13 is a cross-sectional view of the system of FIG. 12.
Figure 14:
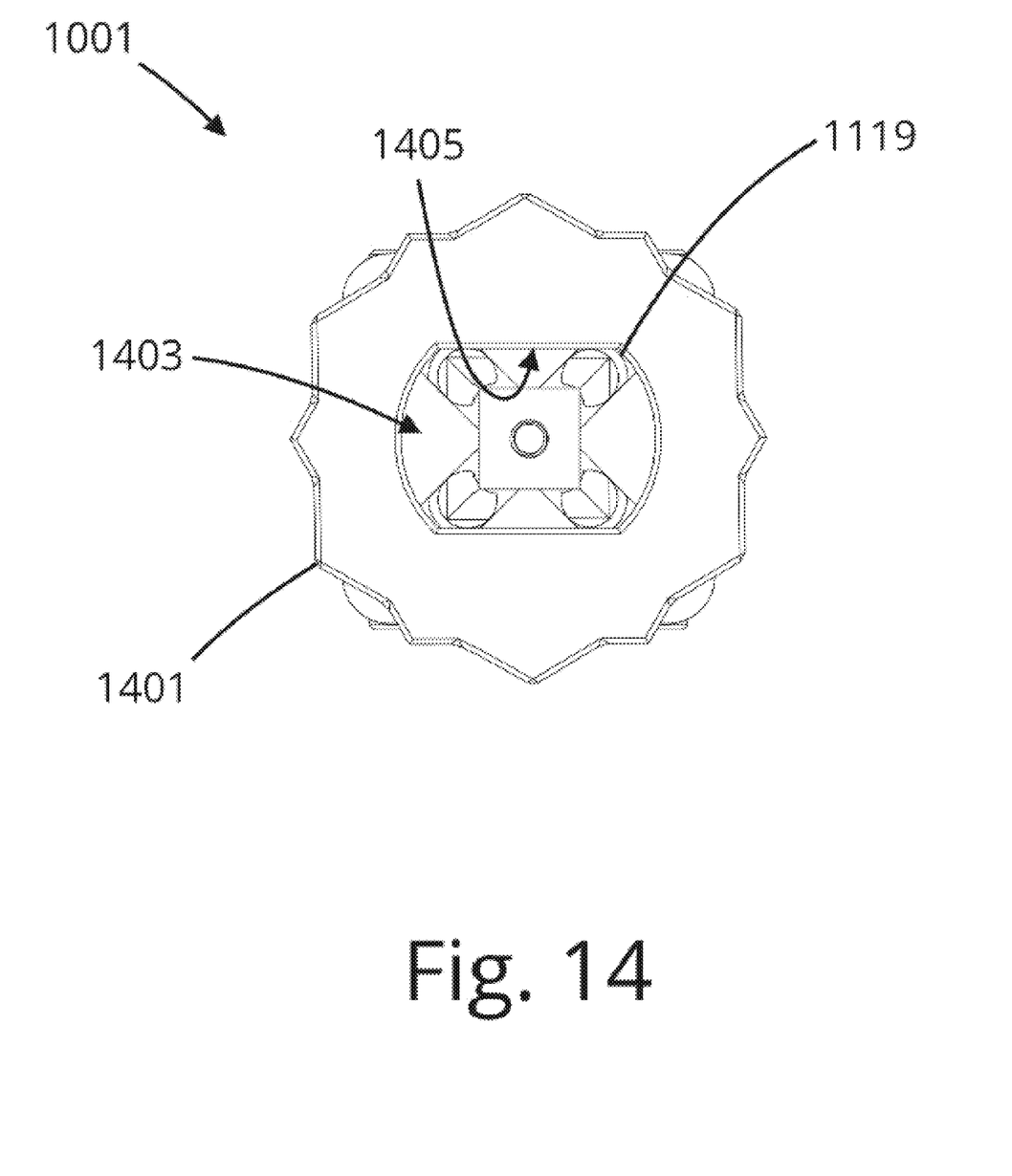
FIG. 14 is a top view of the system of FIG. 10 secured to a female device.

The lower housing 1005 could include a body 1000 forming an inner cavity 1401 with grips 1405 that slide on cylindrical members 1100 disposed within the inner cavity 1401. In this embodiment, a fastener 1102 could be utilized to move the grips 1405, 1407 within cavity. Fastner 1102 could be threaded and configured to threadedly engage with the body 1000 to move grips 1405, 1407. During use, the two elongated grips 1403, 1405 are moved in position to engage with a protrusion 1303 of the male device 1301. To achieve this, two fasteners 1020 and 1022 that engage with an inner body that engages with the grips 1045, 1407 to move them towards protrusion 1303, as shown in FIG. 13.

Upper housing 1003 includes body 1002 with a plurality of slots 1117 extending through the thickness of body 1002. In the exemplary embodiment, the upper housing 1003 includes four slots that are configured to engage with four locking members 1119. A piston head 1121 engages with each of the four locking members 1119 and includes a threaded port 1123.

Figure 12:
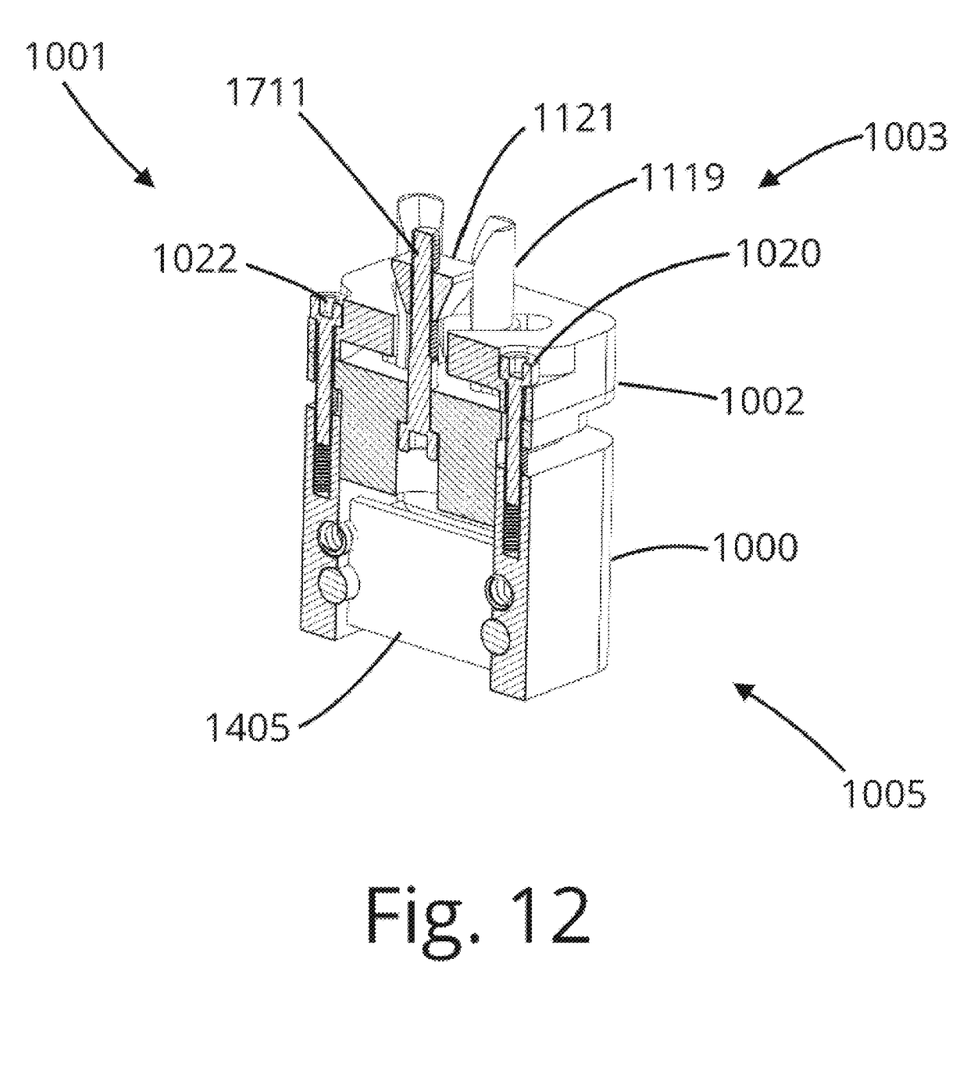
FIG. 12 is a cross-sectional view of the system of FIG. 11.

As shown in FIG. 12, a fastener 1711 has a threaded area that threadedly engages with threaded port 1123. The rotational movement of the fastener 1711 causes the piston head 1121 to move in direction B, which in turn causes the plurality of locking members 1119 to move in direction C. As shown in FIG. 2, the plurality of locking members 1119 includes contoured surfaces that slidingly engage with piston head 1121 and are oriented in a direction to cause the plurality of locking members 1119 to move in direction C as piston head moves in direction B. This feature enables plurality of locking members 1119 to engage with an inner surface 1405 of an opening 1403 formed by female member 1401, as shown in FIG. 14.

Figure 15:
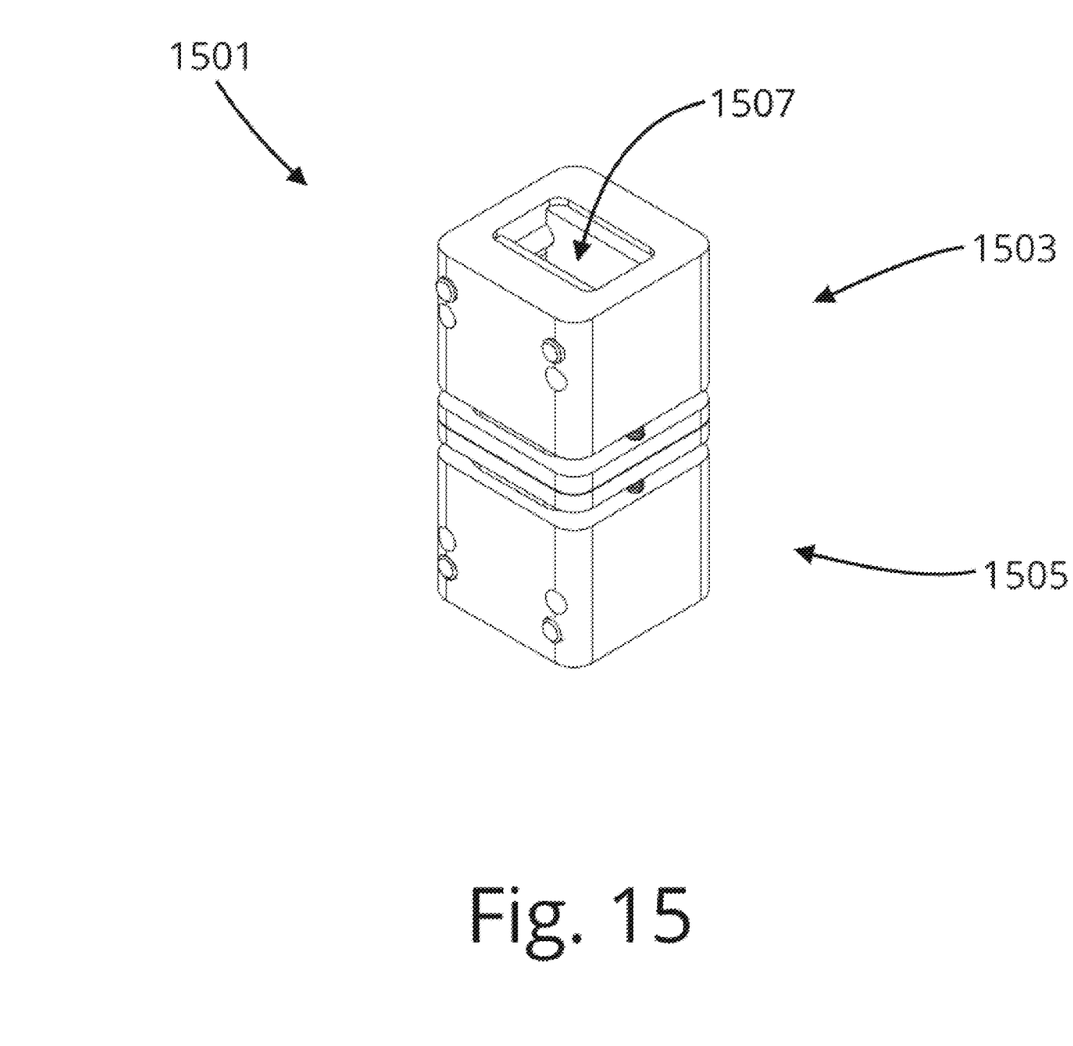
FIG. 15 is an oblique view of an alternative embodiment of the system of FIG. 10.
Figure 16:
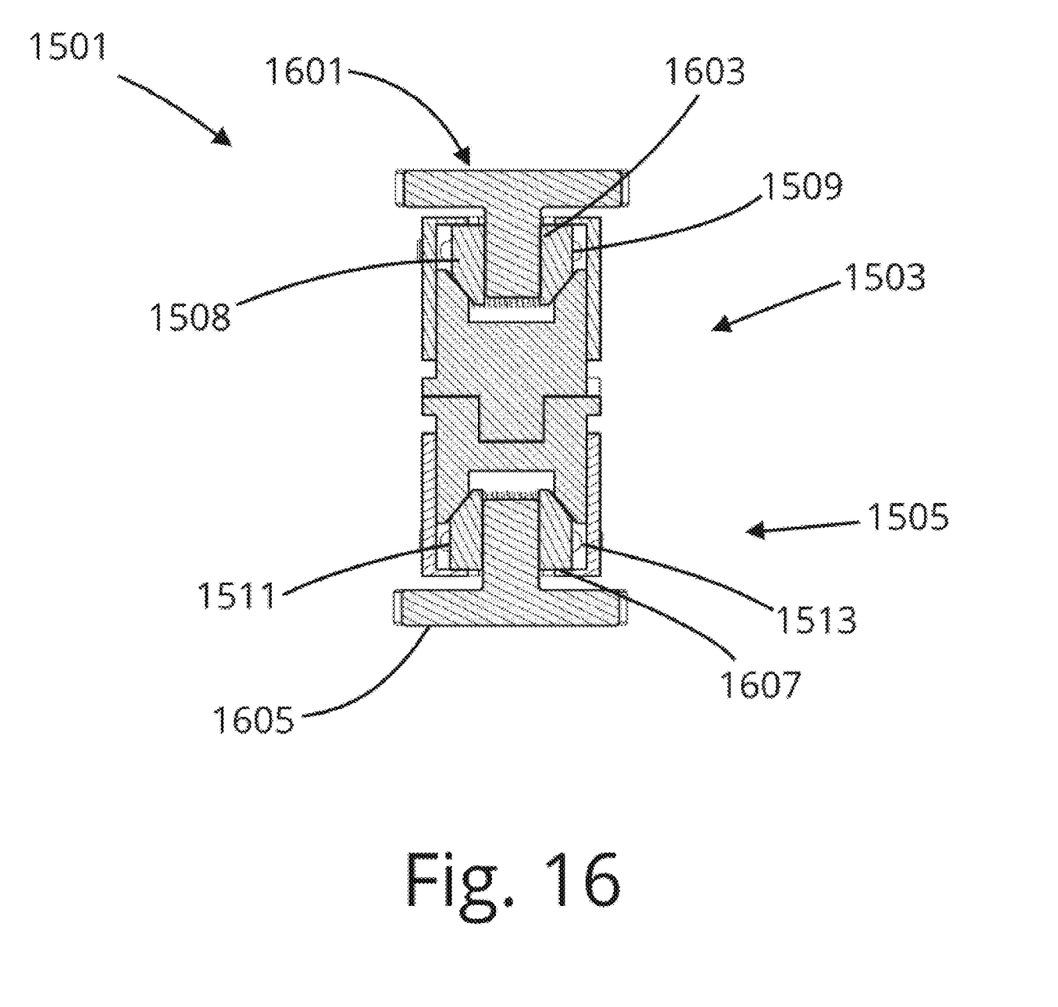
FIG. 16 is a cross-sectional view of the system of FIG. 15.

Referring now to FIG. 15 in the drawings, an alternative embodiment of the present application is shown. System 1501 includes one of more of the features of system 101 and 1001. System 1501 includes an upper housing 1503 integral with a lower housing 1505. In this embodiment, the system 1501 is capable of attaching to respective protrusion 1603 of male device 1601 and protrusion 1607 of male device 1605, as shown in FIG. 15. In the exemplary embodiment, the system 1501 includes cavities 1507, 1506 configured to carry respective grips 1508, 1509 and grips 1511, 1513, as shown in FIG. 16.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments but are amenable to various changes and modifications without departing from the spirit thereof.

What is claimed:

1. A coupling system, comprising:
    an upper housing, having:
        a body with an elongated axis;
        a plurality of slots extending through the body; and
        a plurality of locking members slidingly engaged within each of the plurality of slots, the plurality of locking members are configured to move in a direction away from the elongated axis of the body;
    a lower housing integrally attached to the upper housing, the lower housing having a cavity; and
    a first grip disposed with the housing;

a toggle configured to slidingly engage with the first grip;

wherein the first grip is configured to releasably engage with a protrusion of a male device wherein the toggle causes the first grip to engage with the protrusion as the toggle slides in a direction along the elongated axis; and wherein the upper housing is configured to releasably engage with a female device.

2. The coupling system of claim 1, wherein the plurality of locking members are cylindrical in shape.

3. The coupling system of claim 1, wherein the plurality of locking members releasably engage with an opening formed by the female device.

4. The coupling system of claim 1, further comprising:

a piston head configured to engage with the plurality of locking members;

wherein the piston head moves in a direction parallel to the elongated axis.

5. The coupling system of claim 4, wherein the plurality of locking members include a contoured surface that slidingly engages with the piston head.

6. The coupling system of claim 4, further comprising:

a fastener that engages with the piston head and is configured to move the piston head along the elongated axis, which in turn causes the plurality of locking members to move in the direction away from the elongated axis.

7. The coupling system of claim 1, further comprising:

a second grip disposed with the housing;

wherein the second grip is configured to releasably engage with a protrusion of a male device.

8. The coupling system of claim 1, further comprising:

a slot extending through a body of the lower housing;

wherein a portion of the toggle extends through the slot.

* * * * *